United States Patent
Setlur et al.

(10) Patent No.: US 10,066,948 B2
(45) Date of Patent: Sep. 4, 2018

(54) METHOD AND APPARATUS FOR GENERATING MAP-BASED SNIPPETS

(75) Inventors: Vidya Setlur, Cupertino, CA (US); Hiroshi Horii, Palo Alto, CA (US)

(73) Assignee: Nokia Technologies Oy, Espoo (FI)

( * ) Notice: Subject to any disclaimer, the term of this patent is extended or adjusted under 35 U.S.C. 154(b) by 1291 days.

(21) Appl. No.: 12/794,341

(22) Filed: Jun. 4, 2010

(65) Prior Publication Data

US 2011/0301831 A1 Dec. 8, 2011

(51) Int. Cl.
*G01C 21/34* (2006.01)
*G06F 17/30* (2006.01)
(Continued)

(52) U.S. Cl.
CPC ....... *G01C 21/34* (2013.01); *G06F 17/30241* (2013.01); *G01C 21/26* (2013.01);
(Continued)

(58) Field of Classification Search
CPC ...... G06F 17/2745; G06F 17/30; G06F 17/00; G06F 17/3089; G06F 15/16; G06F 21/00; G06F 15/173; G06F 3/048; G06F 17/30241; G06F 17/30864; G06F 17/2247; G06F 17/3087; G06F 3/04842; G06F 3/0481; G06F 3/04817; G06F 3/04845; G06F 3/04847; G06F 3/0485; G06F 3/0482; G06F 3/04812; G06Q 50/00; G06Q 10/0631;
(Continued)

(56) References Cited

U.S. PATENT DOCUMENTS 6,275,829 B1 8/2001 Angiulo et al.
6,292,743 B1 9/2001 Pu et al.
(Continued)

FOREIGN PATENT DOCUMENTS

CN 1529262 10/2003
EP 1 168 204 A2 1/2002
(Continued)

OTHER PUBLICATIONS

International Search Report and Written Opinion for International Application No. PCT/FI2011/050121, dated Jun. 20, 2011.
(Continued)

*Primary Examiner* — Behrang Badii
(74) *Attorney, Agent, or Firm* — Alston & Bird LLP

(57) ABSTRACT

Various methods for generating map-based snippets are provided. One example method includes determining that a content page identifier includes an indication that a content page includes a map. In this regard, data for rendering the content page may include at least destination information. The method may also include in response to determining that the content page identifier includes an indication that the content page includes a map, extracting the destination information from the content page. The example method may further include constructing a user interface snippet that is selectable for retrieving the content page, where the user interface snippet includes a component that is generated based at least in part on the destination information. Similar and related example methods and example apparatuses are also provided.

14 Claims, 13 Drawing Sheets

(51) Int. Cl.

| | |
|---|---|
| G01C 21/36 | (2006.01) |
| G06F 17/27 | (2006.01) |
| G06Q 10/06 | (2012.01) |
| G06Q 99/00 | (2006.01) |
| G06F 17/00 | (2006.01) |
| G06Q 50/00 | (2012.01) |
| G06F 3/048 | (2013.01) |
| G01C 21/26 | (2006.01) |
| G01C 21/32 | (2006.01) |

(52) U.S. Cl.
CPC ........... *G01C 21/32* (2013.01); *G01C 21/367* (2013.01); *G06F 3/048* (2013.01); *G06F 17/00* (2013.01); *G06F 17/2745* (2013.01); *G06F 17/30* (2013.01); *G06F 17/3087* (2013.01); *G06F 17/30864* (2013.01); *G06Q 10/0631* (2013.01); *G06Q 50/00* (2013.01); *G06Q 99/00* (2013.01)

(58) Field of Classification Search
CPC .... G06Q 99/00; G06Q 30/0256; G01C 21/26; G01C 21/3682; G01C 21/32; G01C 21/3673; G01C 21/367; H04L 29/08; G09B 29/12; G06T 3/0018; G06T 3/40; G06T 3/4038
USPC .......................................................... 701/200
See application file for complete search history.

(56) References Cited

U.S. PATENT DOCUMENTS

| | | | |
|---|---|---|---|
| 6,826,472 | B1 | 11/2004 | Kamci et al. |
| 6,904,360 | B2 | 6/2005 | Pechatnikov et al. |
| 8,166,013 | B2* | 4/2012 | Bandaru ............ G06F 17/2745 707/705 |
| 8,443,081 | B2* | 5/2013 | Tiu ..................... G06F 17/3089 709/203 |
| 2004/0001104 | A1 | 1/2004 | Sommerer et al. |
| 2005/0251736 | A1 | 11/2005 | Ran et al. |
| 2006/0069502 | A1 | 3/2006 | Saito |
| 2006/0129636 | A1 | 6/2006 | Matsuura et al. |
| 2006/0167629 | A1 | 7/2006 | Ishii et al. |
| 2006/0271287 | A1* | 11/2006 | Gold ...................... G01O 21/26 701/426 |
| 2008/0036778 | A1 | 2/2008 | Sheha et al. |
| 2008/0222143 | A1 | 9/2008 | Backer et al. |
| 2008/0262714 | A1 | 10/2008 | Abramovich Ettinger |
| 2009/0088964 | A1* | 4/2009 | Schaaf ................ G01O 21/367 701/532 |
| 2009/0119008 | A1 | 5/2009 | Kobuya et al. |
| 2009/0119268 | A1* | 5/2009 | Bandaru ............ G06F 17/2745 705/7.12 |
| 2009/0177745 | A1* | 7/2009 | Davis et al. .................. 709/204 |
| 2010/0125405 | A1 | 5/2010 | Chae et al. |
| 2010/0131186 | A1 | 5/2010 | Geelen et al. |
| 2010/0205541 | A1* | 8/2010 | Rapaport et al. ............. 715/753 |

FOREIGN PATENT DOCUMENTS

| | | |
|---|---|---|
| EP | 1 647 906 A2 | 4/2006 |
| WO | WO 01/35315 A2 | 5/2001 |
| WO | WO 2006/031549 A2 | 3/2006 |
| WO | WO 2007/101731 A2 | 9/2007 |
| WO | WO 2007/118424 A1 | 10/2007 |
| WO | WO 2008/130932 A1 | 10/2008 |
| WO | WO 2008/140167 A1 | 11/2008 |

OTHER PUBLICATIONS

Chitu, A.; Google Maps in Search History. [online] Google Operating System, Unofficial news and tips about Google, Nov. 10, 2006 [retrieved on Jun. 13, 2011]. Retrieved from the Internet: <URL: http://googlesystem.blogspot.com/2006/11/ google-maps-in-search-history.html>.
Tyson R. Henry; Scott E. Hudson; Multidimensional Icons; ACM Transactions on Graphics, vol. 9, No. 1, Jan. 1990; pp. 133-137.
J. P. Lewis; Ruth Rosenholtz; Nickson Fong; Ulrich Neumann; VisualIDs: Automatic Distinctive Icons for Desktop Interfaces; International Conference on Computer Graphics and Interactive Techniques; ACM SIGGRAPH 2004 Papers; Los Angeles, California; 2004; pp. 1-19.
Heidi Lam; Patrick Baudisch; Summary Thumbnails: Readable Overviews for Small Screen Web Browsers; Conference on Human Factors in Computing Systems; Portland, Oregon, 2005; pp. 681-690.
Allison Woodruff; Andrew Faulring; Ruth Rosenholts; Julie Morrison; Peter Pirolli; Using Thumbnails to Search the Web; Conference on Human Factors in Computing Systems; Seattle, Washington; 2001; pp. 198-205.
Office Action from corresponding Canadian Patent Application No. 2,801,337, dated Oct. 3, 2016.
Office Action for corresponding Chinese Application No. 201180027689.1 dated Sep. 18, 2015.
Office Action for Canadian Application No. 2,801,337 dated May 7, 2015.
Office Action for Chinese Application No. 201180027689.1 dated May 19, 2015.
Extended European Search Report from corresponding European Patent Application No. 11789307 dated Jun. 1, 2016.
Office Action from Canadian Application No. 2,801,337 dated Feb. 2, 2016.
ArcGIS Online Help, "Use URL Parameters to Modify Maps"; downloaded from URL: https://doc.arcgis.com/en/arcgis-online/reference/use-url-parameters.htm, on Mar. 31, 2016.
Microsoft, "Create a Custom Map URL", downloaded from URL: https://msdn.microsoft.com/en-ca/library/dn217138.aspx on Mar. 31, 2016.
MapBox, "Maps", downloaded from URL: http://www.mapbox.com/developers/api/maps/ on Mar. 31, 2016.
ProgrammableWeb, "Top 10 Mapping APIs: Google Maps, Microsoft Bing Maps and MapQuest", downloaded from URL: http://www.programmableweb.com/news/top-10-mapping-apis-google-maps-microsoft-bing-maps-and-mapquest/analysis/2015/02/23, on Mar. 31, 2016.
MapQuest + Developer, "Link to MapQuest Guide", downloaded from URL: http://www.mapquestapi.com/link-to-mapquest/ on Mar. 31, 2016.
Office Action for Chinese Application No. 201180027689.1 dated Apr. 11, 2016.
Office Action from corresponding Chinese Patent Application No. 201180027689.1, dated Dec. 26, 2014.
Office Action from corresponding Canadian Patent Application No. 2,801,337, dated May 26, 2014.
International Preliminary Report on Patentability from corresponding International Application No. PCT/US2012/065610, dated Jul. 15, 2014.

\* cited by examiner

METHOD AND APPARATUS FOR GENERATING MAP-BASED SNIPPETS

TECHNICAL FIELD

Embodiments of the present invention relate generally to semantic user interface techniques, and, more particularly, relate to a method and apparatus for generating map-based snippets.

BACKGROUND

As mobile computing and communications devices become increasingly flexible and convenient, users of the devices have become increasingly reliant on the functionality offered by the devices in both social and business settings. Due to advances made in the data storage capabilities, the communications capabilities, and the processing power of mobile devices, the functionality offered by the devices continues to evolve. As new functionalities are introduced or become popular, the user demand for convenient and intuitive user interface techniques also increases. To meet the demands of the users or encourage utilization of new functionality, innovation in the design and operation of user interfaces must keep pace.

SUMMARY

Example methods and example apparatuses are described herein that provide for generating map-based snippets that may presented on a user interface to provide for retrieving content pages that include a map. One example method includes determining that a content page identifier includes an indication that a content page includes a map. In this regard, data for rendering the content page may include at least destination information. The method may also include in response to determining that the content page identifier includes an indication that the content page includes a map, extracting the destination information from the content page. The example method may further include constructing a user interface snippet that is selectable for retrieving the content page, where the user interface snippet includes a component that is generated based at least in part on the destination information.

An additional example embodiment is an apparatus configured to generate map-based snippets. The example apparatus comprises at least one processor and at least one memory including computer program code, the at least one memory and the computer program code configured to, with the at least one processor, direct the apparatus to perform various functionality. In this regard, the example apparatus may be directed to determine that a content page identifier includes an indication that a content page includes a map. In this regard, data for rendering the content page may include at least destination information. The apparatus may also be directed to, in response to determining that the content page identifier includes an indication that the content page includes a map, extract the destination information from the content page. The example apparatus may be further directed to construct a user interface snippet that is selectable for retrieving the content page, where the user interface snippet includes a component that is generated based at least in part on the destination information.

Another example embodiment is a computer program product comprising a memory having computer program code stored thereon, wherein the computer program code is configured to direct an apparatus to perform various functionalities. In this regard, the program code may be configured to direct an apparatus to determine that a content page identifier includes an indication that a content page includes a map. Data for rendering the content page may include at least destination information. The program code may be further configured to, in response to determining that the content page identifier includes an indication that the content page includes a map, direct an apparatus to extract the destination information from the content page. The program code may also be configured to direct the apparatus to construct a user interface snippet that is selectable for retrieving the content page, where the user interface snippet includes a component that is generated based at least in part on the destination information.

Another example apparatus includes means for determining that a content page identifier includes an indication that a content page includes a map. In this regard, data for rendering the content page may include at least destination information. The apparatus may also include means for extracting the destination information from the content page, in response to determining that the content page identifier includes an indication that the content page includes a map. The example apparatus may further include means for constructing a user interface snippet that is selectable for retrieving the content page, where the user interface snippet includes a component that is generated based at least in part on the destination information.

BRIEF DESCRIPTION OF THE DRAWING(S)

Having thus described example embodiments of the invention in general terms, reference will now be made to the accompanying drawings, which are not necessarily drawn to scale, and wherein:

DETAILED DESCRIPTION

Figure 1:
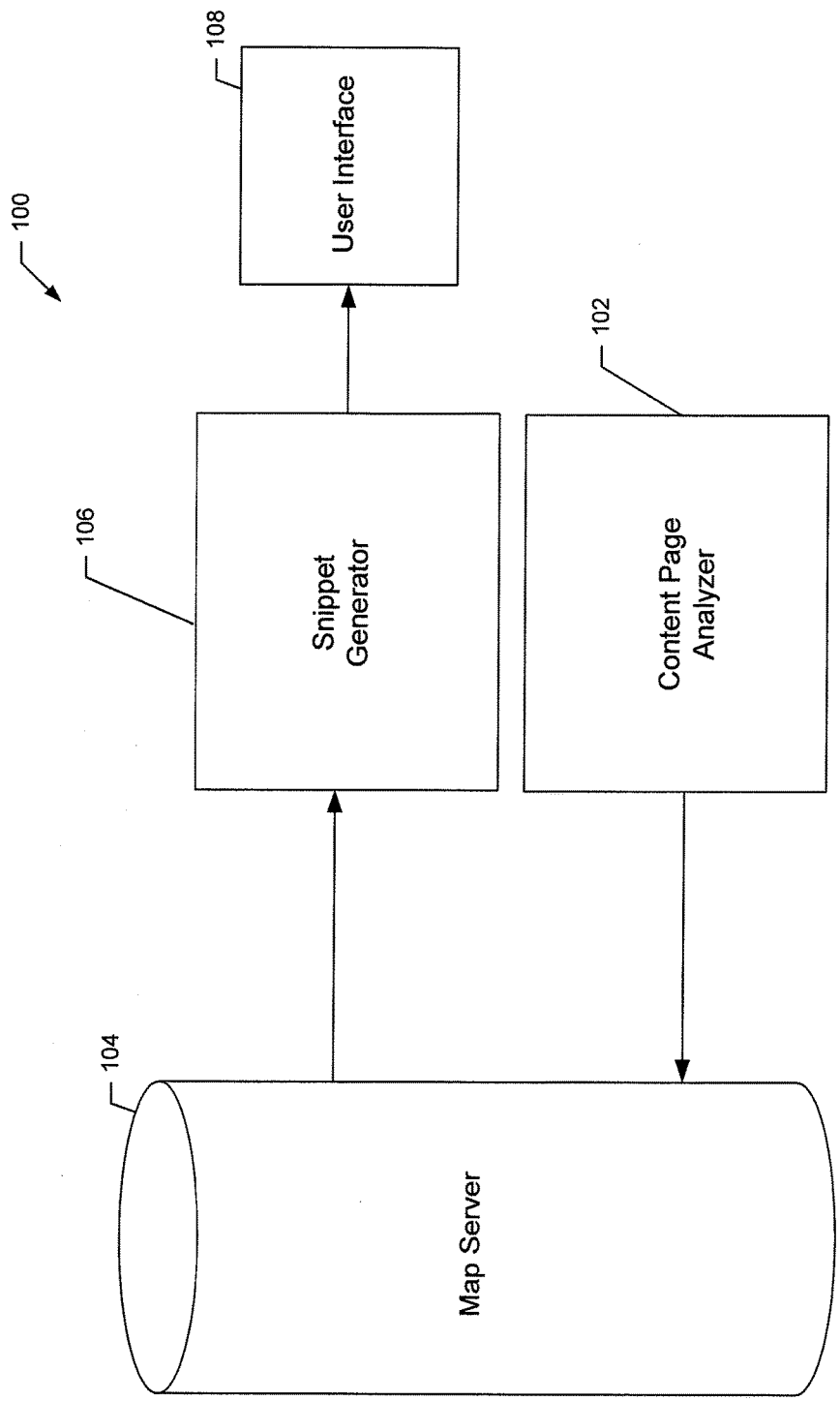
FIG. 1 illustrates a block diagram of an apparatus for generating and displaying map-based snippets according to an example embodiment of the present invention.

Example embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments of the present invention, to refer to data capable of being transmitted, received, operated on, and/or stored.

As used herein, the term 'circuitry' refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

Numerous web pages (e.g., Google Maps, Yahoo! Maps, and the like) provide users with the ability to search for or otherwise identify the geographic location of a desired destination, and a route for traveling to the destination, on a rendered map. These web pages may provide a rendering of a map with an indication of the destination, and provide information about the destination, such as the name, physical address, coordinates (e.g., longitude and latitude), and the like. Some web pages may also provide directions from a start point to the destination (e.g., rendered map-based directions or textual directions, etc.), estimated transit time between the start point and the destination, and the like. A user may wish to use these web pages to search for an address or location of a particular destination.

In some instances, users may wish to later retrieve the same web pages via a browser's history. However, it may be difficult to find the right map web page for a particular map-based search using, for example, an arbitrarily generated scaled-down thumbnail of the map-based web page. This may be due to a scaled-down thumbnail not providing particularly distinctive attributes to facilitate a user's ability to recognize the associated destination.

Accordingly, various example embodiments of the present invention facilitate a user's ability readily recall and access a previously performed map-based search via a map-based snippet that includes components (e.g., images of related objects, meaningful text, or the like) that facilitate a user's ability to recognize the search or the destination that is associated with the map-based snippet. In this regard, the snippet may include, according to some example embodiments, semantically meaningful components, with the purpose of creating a more meaningful linking item for retrieving a previous map-based search or previously accessed content page that includes a map. According to some example embodiments, the construction of the map-based snippets may be designed to facilitate viewing of the snippet on devices having relatively small displays, such as mobile phones or car navigation systems, as well as devices having larger displays, such as home personal computers. The snippets may include various components such as a simplified map/route, information about the searched destination, textual content, or the like.

Various example embodiments of the present invention relate to the generation of a map-based snippet. In some example embodiments, the map-based snippet may function to summarize the results of a map search and the map-based snippet may be constructed in a manner that facilitates a user being able to readily recognize and recall the previously performed search. In this regard, the map-based snippet may be an icon or other selectable item for linking to a content page (e.g., a web page) that includes the result of a previously performed map-based search for a destination or a route to a destination. The map-based snippet may be selectable by a user to initiate retrieval of the content page that is linked to the map-based snippet. To construct the map-based snippet, information, such as destination information, may be extracted from a content page, and, based on the extracted information, related information may be generated or retrieved as components to construct a map-based snippet. The map-based snippet, according to some example embodiments, may be rendered and visually displayed as part of a history log and presented in a history log user interface. The history log may include a collection of identifiers (e.g., uniform resource locators (URLs)) of previously retrieved content pages, some of which may include a map generated in response to a map-based search. A map-based snippet may be generated for the content pages that include a map.

According to various example embodiments, two types of map-based snippets may be constructed. A first type may be a location-based snippet. A location-based snippet may be constructed for a content page that provides a destination and information associated with the destination, but need not provide a route or directions for traveling to the destination. Location-based map content pages may be content pages that include a map that users access to obtain more information about a destination, such as the address, scheduling information (e.g., store hours, movie times, etc.), interesting facts about the destination, or the like.

A second type of map-based snippet may be a direction-based snippet. A direction-based snippet may be constructed for a content page that includes a route or directions for traveling to the destination from a starting point. In this regard, direction-based map content pages may also include information such as estimated travel time to the destination, or biking, pedestrian, or driving routes.

To generate both location-based snippets and direction-based snippets, the block diagram of the example apparatus 100 of FIG. 1 may be implemented. In this regard, the example apparatus 100 may include a content page analyzer 102, a map server 104, a snippet generator 106, and a user interface 108, each of which may be implemented or controlled by a processor and/or a memory of an electronic device, such as the processor 505 and/or the memory device 510 of FIG. 5.

The content page analyzer 102 may be configured to analyze the content pages that have been previously visited or retrieved by a browser to determine which of the content pages are related to maps. In this regard, the content page analyzer 102 may access a history log, such as a browser history, to retrieve and analyze identifiers of content pages included in the history log. To determine whether a content page includes a map, the content page analyzer 102 may be configured to analyze a content page identifier (e.g., a uniform resource locator (URL), address, or the like) to determine whether or not a content page associated with the identifier includes a map. For example, URLs that include domain names of map web pages may be an indicator that the content page includes a map.

Upon determining that a content page includes a map, the content page analyzer may extract information from the identifier or the content page. In this regard, the extracted information may include destination information such as the name of the destination (e.g., the business name), the coordinates of the destination, a category of for the destination (e.g., restaurant, auto shop, bank, amusement park, museum, hospital, pharmacy, post office, residence, etc.), or the like. In some example embodiments, information regarding a starting point may also be extracted, such as the name of the starting point (e.g., the business name), the coordinates of the starting point, a category of the starting point (e.g., restaurant, auto shop, bank, amusement park, museum, hospital, pharmacy, post office, residence, previously determined current location, etc.), or the like. Further, in some example embodiments, additional routing information may be extracted, such as an estimated transit time from the starting point to the destination, mileage from the starting point to the destination, a transportation type (e.g., highway, bicycle, pedestrian, etc.), or the like. In some example embodiments, the content page identifier may include or be stored with search criteria that a user entered to perform a map based search for a destination. The search criteria, which may also be extracted, may include the name of the destination, or the category of the destination.

Some or all of the extracted information (e.g., the destination information) may be transferred to the map server 104 in the form of a query. The map server 104 may be embodied locally on the same device as the content page analyzer 102, or embodied remotely on a separate device. Based at least on the extracted information, the map server 104 may provide components for constructing a map-based snippet to the snippet generator 106. In some example embodiments, the components may be images of objects that bear a relationship to the destination, and, for example, the category of the destination may be used to determine which images to provide. For example, if the category is a restaurant, one or more images of food and drink items may be provided, depending on the design template for the respective map-based snippet (e.g., location-based design template or direction-based design template. In some example embodiments, the components may be generated by the map server 104 as a filtered and scaled depiction of a route from the starting point to the destination. Components may also include text (e.g., title or header text, street names, names for the stating point and the destination, distance text, etc.), an image of a street or highway sign for a street or highway on the route, point of interest information, other route information, or the like. According to some example embodiments, the map server 104 may provide information that the snippet generator may use to generate components. In this regard, the map server 104 may provide route and point of interest information about the start point and/or the destination.

The snippet generator 106 may be configured to receive the components from the map server 104 and construct the map-based snippet by including the components in the snippet. In some example embodiments, the components may be generated by the snippet generator 104 rather than at the map server 104 as a filtered and scaled depiction of a route from the starting point to the destination. In this regard, according to some example embodiments, the map server 104 may provide data to the snippet generator 106 that the snippet generator 104 may use to generate some components for inclusion in the map-based snippet. According to various example embodiments, the snippet generator 106 may be embodied in the same device as the content page analyzer 102. The snippet generator 106 may be configured to generate the map-based snippets in accordance with defined snippet design templates as further described below. The snippet generator 106 may also be configured to link the map-based snippet with the associated content page by linking the snippet with a content page identifier (e.g., by including the URL of the content page as an attribute of the snippet). The constructed snippets may be provided by the snippet generator 106 to a user interface 108, which may be embodied on the same device as the snippet generator 106 and the content page analyzer 102. The user interface 108 may be configured to render and display, or otherwise present the map-based snippet to a user to facilitate, for example, viewing of the snippet and selection of the snippet to retrieve the associated content page. In this regard, the snippet may be generated such that it is selectable for retrieving the content page.

Figure 2A:
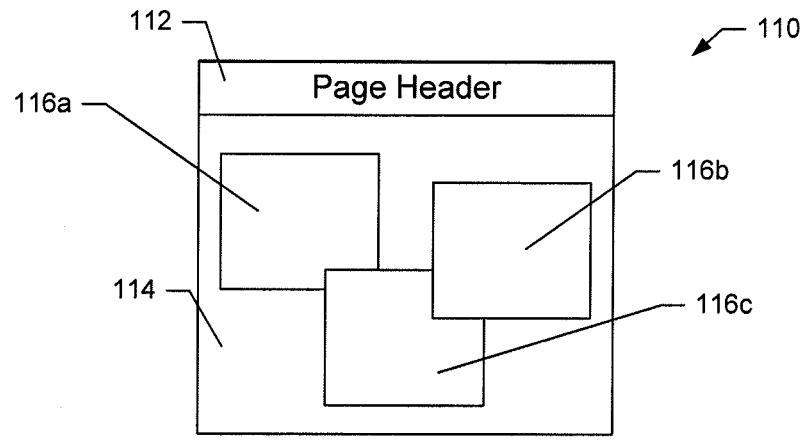
FIGS. 2a and 2b illustrate example design templates for map-based snippets according to an example embodiment of the present invention.
Figure 2B:
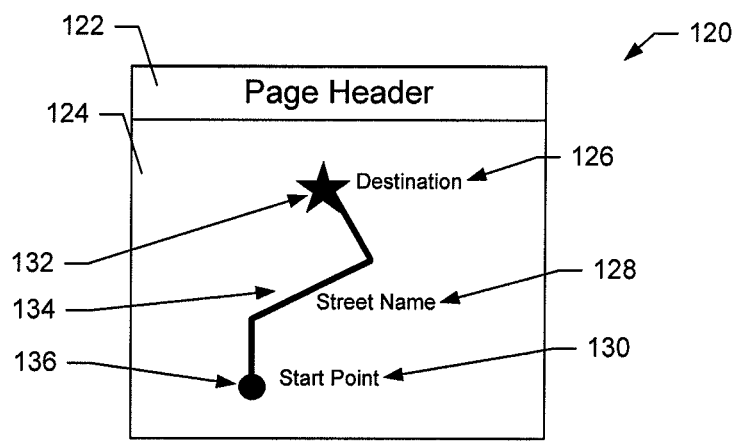

As mentioned above, a map-based snippet may be constructed in conformance with a design template. FIGS. 2a and 2b provide example design templates for map based-snippets. The design template 110 of FIG. 2a may be used to construct a location-based snippet. The design template 110 may include a header component 112 and a body area 114. The header component 112 may include text that indicates, for example, a name of the destination associated with the snippet. The body area 114 may include one or more image components 116 (e.g., image components 116a, 116b, and 116c). As described above, the image components 116 may depict images of objects that bear a relationship to the destination of the associated content page. The components may also include tags and point of interest information about the destination. The snippet generator 106 may therefore be configured to position components that are received from the map server 104 or generated by the snippet generator 106 into the positions of the header component 112 or the image components 116 to construct the snippet.

The design template 120 of FIG. 2b may be used to construct a direction-based snippet. The design template 120 may include a header component 122 and a body area 124. The header component 122 may include text that indicates, for example, a name of the destination associated with the snippet. The body area 124 may include various route related components. With regard to text components in the body area 124, the text components may include a destination or other location name 126, one or more street names 128, and a start point name 130. With regard to image components of the body area 124, the image components may include a destination image component 132, which may be generic (e.g., a star or a checkered flag) or related to a category for the destination (e.g., image of a bank, hospital, etc.), a start point image component 136, which may also be generic (e.g., a circle or a green flag) or related to a category for the start point (e.g., image of a house, hotel, etc.). Thus, the image components may depict images of objects that bear a relationship to the destination or starting point of the associated content page.

Figure 3:
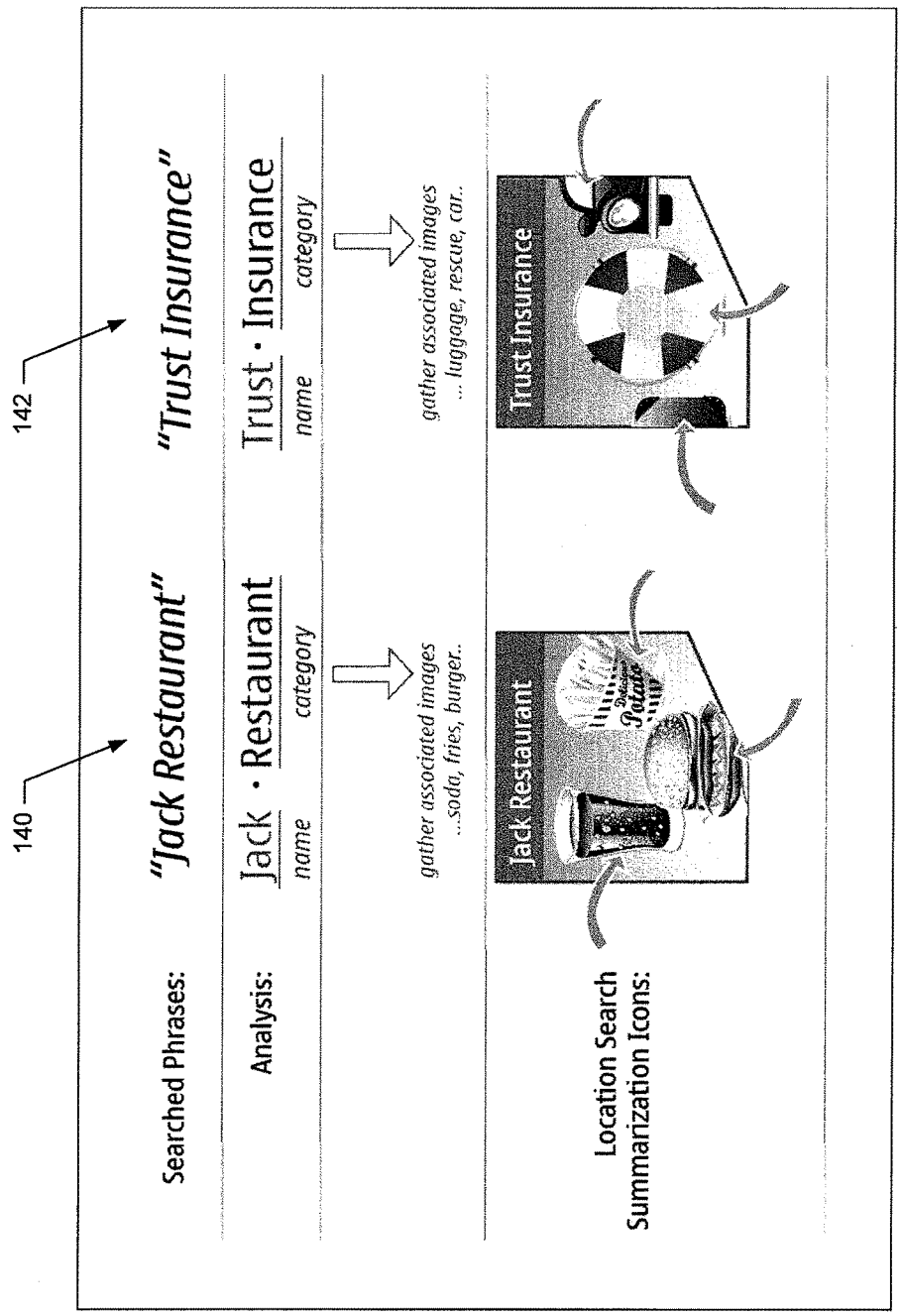
FIG. 3 illustrates examples of location-based snippets according to an example embodiment of the present invention.

The destination-based snippet may also include a route image component 134. The route image component may be a filtered and scaled version of the route provided by the associated content page. In this regard, referring to FIG. 3, the image of the route 152 as provided by the map 159 of the related content page may be modified to improve recognition and/or provide for clean presentation on smaller displays or lower resolution displays. The image of the route 152 taken from the map of the content page may be reduced or filtered to a set of vector primitives and scaled to simplify the rendering of the route. In this regard, route 152 illustrates the route provided by the map of the content page, and route 162 illustrates the same route after filtering and scaling. In addition to simplifying the route, the outlines of buildings or landmarks provided on the map of the content page may be similarly simplified. In this regard, referring to FIG. 3, the image of building 154 can be filtered and scaled to be the image of the building 164. Similarly, the image of building 156 can be filtered and scaled to be the image of the building 166. According to some example embodiments, the modified map 160 may be provided as a component, or each of the route 162, and the buildings 164 and 166 may be provided as separate components.

As with the location-based snippet, the direction-based snippet may also be constructed by the snippet generator 106 based on the design template 120. In this regard, the snippet generator 106 may assemble the text and image components into the positions of the header component 122 and the positions of the text components or the image components in the body area to construct the direction-based snippet.

Figure 4:
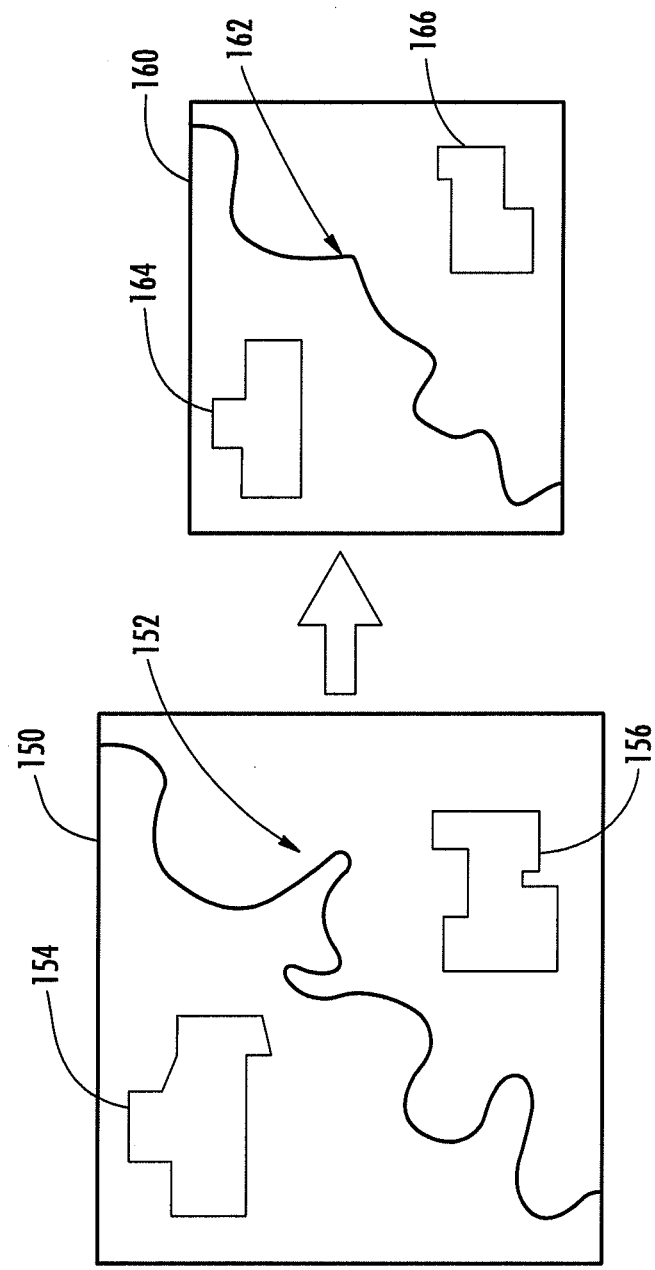
FIG. 4 illustrates route simplification for use with a map-based snippet according to another example embodiment of the present invention.

FIG. 4 provides a description of an example process of generating some location-based snippets and depictions of the resultant snippets. In this regard, at 140, a user may have searched for the name "Jack Restaurant" in a map-based content page as a destination and viewed the results. The retrieval of the content page may be stored in a history log. Prior to, or in response to, a user accessing the history log, an analysis of the results may occur. The analysis may operate to decompose the destination name "Jack Restaurant" to determine a category of the destination. The category may be used as criteria in a query to, for example, the map server 104 to retrieve one or more components. Here, at 140, since the category is "restaurant," images of food (e.g., soft drink, burger, and fries) are populated as the components of the snippet when constructing the snippet in accordance with the design template. Further, the name of the destination, "Jack Restaurant," may be inserted in the header of the snippet.

Further at 142, a user may have searched for the name "Trust Insurance" in a map-based content page as a destination and viewed the results. Again, the retrieval of the content page may be stored in a history log. Prior to, or in response to, a user accessing the history log, an analysis of the results may occur. The analysis may operate to decompose the name "Trust Insurance" to determine a category of the destination. The category may be used as criteria in a query to, for example, the map server 104 to retrieve one or more components. Here, at 142, since the category is "insurance," images of items to be insured and life saving gear (e.g., luggage, rescue float, and car) are populated as the components of the snippet when constructing the snippet in accordance with the design template. Further, the name of the destination, "Trust insurance," may be inserted in the header of the snippet.

Figure 5:
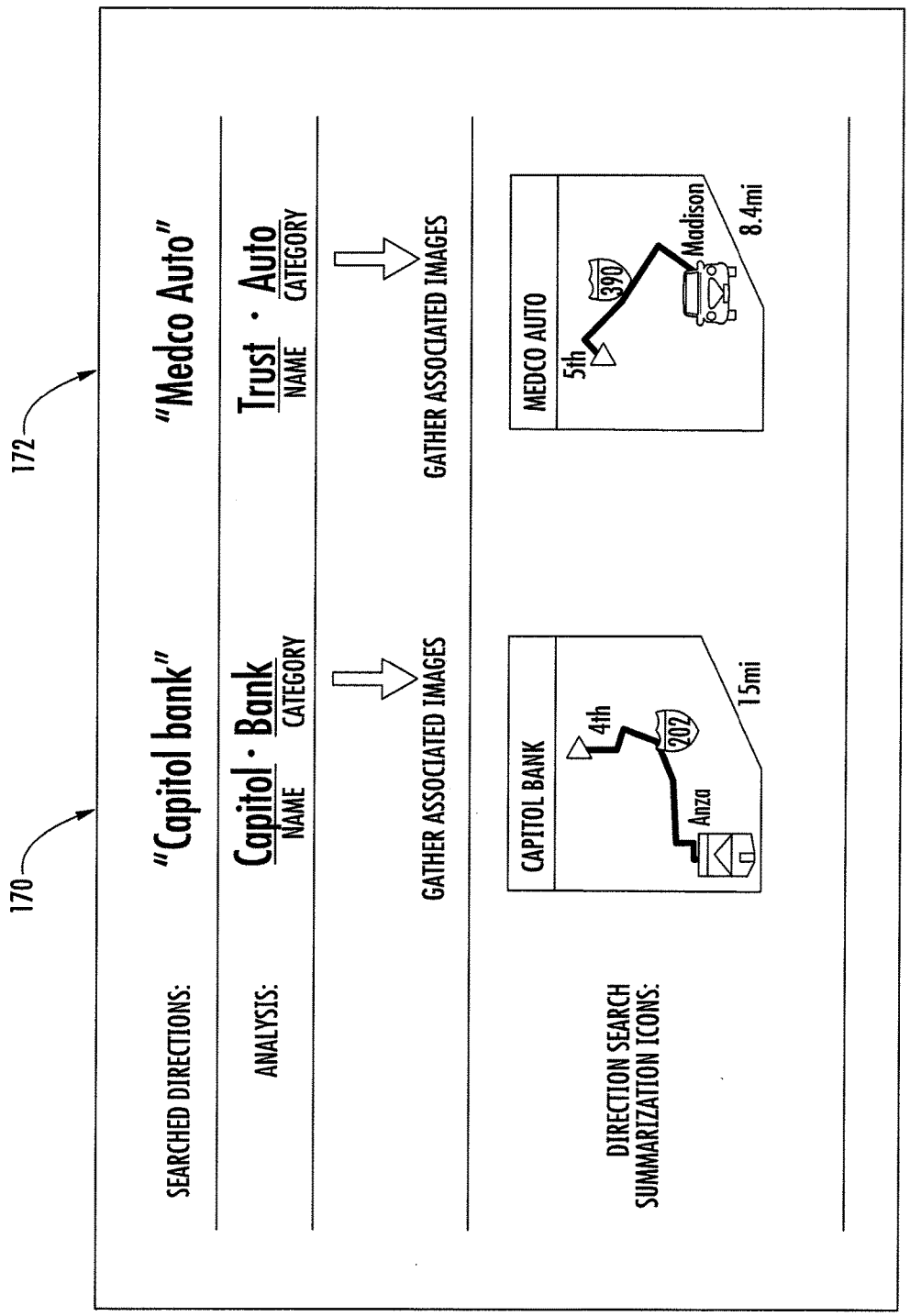
FIGS. 5 and 6 illustrate examples of direction-based snippets according to an example embodiment of the present invention.

FIG. 5 provides a description of an example process of generating direction-based snippets and depictions of the resultant snippets. In this regard, at 170, a user may have searched for the name "Capitol Bank" in a map-based content page as a destination relative to a start point to get a route and viewed the results. The retrieval of the content page may be stored in a history log. Prior to, or in response to, a user accessing the history log, an analysis of the results may occur. The analysis may operate to decompose the name "Capitol Bank" to determine a category of the destination. The category may be used as criteria in a query to, for example, the map server 104 to retrieve one or more components. Here, at 170, since the category is "bank," an image of a bank may be populated as the destination image component of the snippet when constructing the snippet in accordance with the design template. Components may also be populated based on the design template that indicate the starting point (e.g., flag image and text indicating "4$^{th}$"), that indicate the route (e.g., the route image, and the road sign image), and that indicate the destination (e.g., the bank image and the text indicating "Anza"). A distance component may be included as indicated in the lower right-hand corner of the snippet.

At 172, another direction-based snippet is provided where a user may have searched for the name "Medco Auto" in a map-based content page as a destination relative to a start point to get a route and viewed the results. The retrieval of the content page may be stored in a history log. Prior to, or in response to, a user accessing the history log, an analysis of the results may occur. The analysis may operate to decompose the name "Medco Auto" to determine a category of the destination. The category may be used as criteria in a query to, for example, the map server 104 to retrieve one or more components. Here, at 172, since the category is "auto," an image of a car may be populated as the destination image component of the snippet when constructing the snippet in accordance with the design template. Components may also be populated based on the design template that indicate the starting point (e.g., flag image and text indicating "5$^{th}$"), that indicate the route (e.g., the route image, and the road sign image), and that indicate the destination (e.g., the car image and the text indicating "Madison"). A distance component may be included as indicated in the lower right-hand corner of the snippet.

Figure 6:
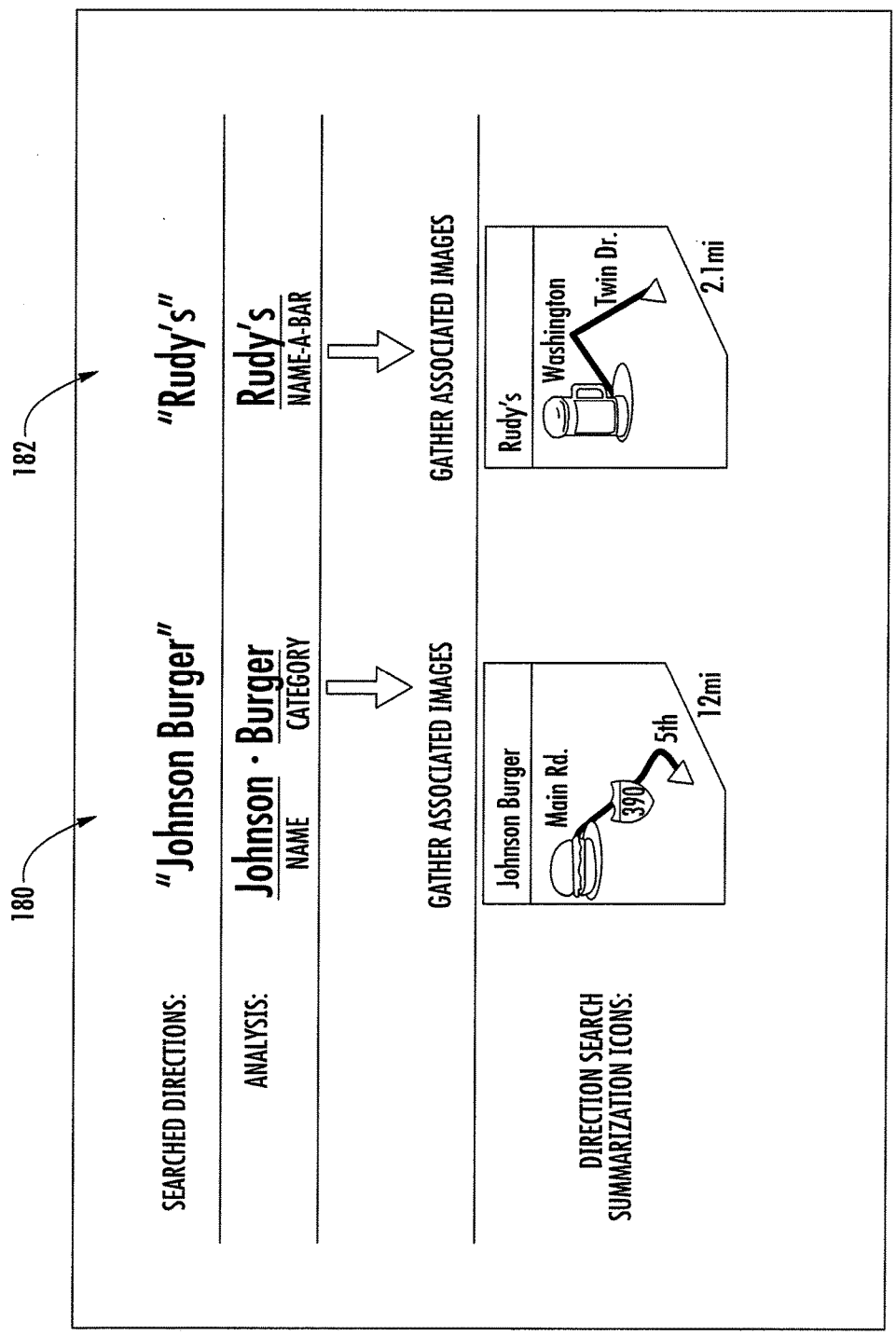

FIG. 6 provides additional examples of direction-based snippets at 180 and 182. The direction-based snippets of FIG. 6 may be constructed in manner similar to how the snippets are constructed as described above. However, it is noteworthy that, with respect to the snippet generated at 182, that the category cannot be directly extracted from the name. The name "Rudy's" does not indicate a category of a bar without further information, such as point of interest information, that may be extracted from the content page.

Figure 7:
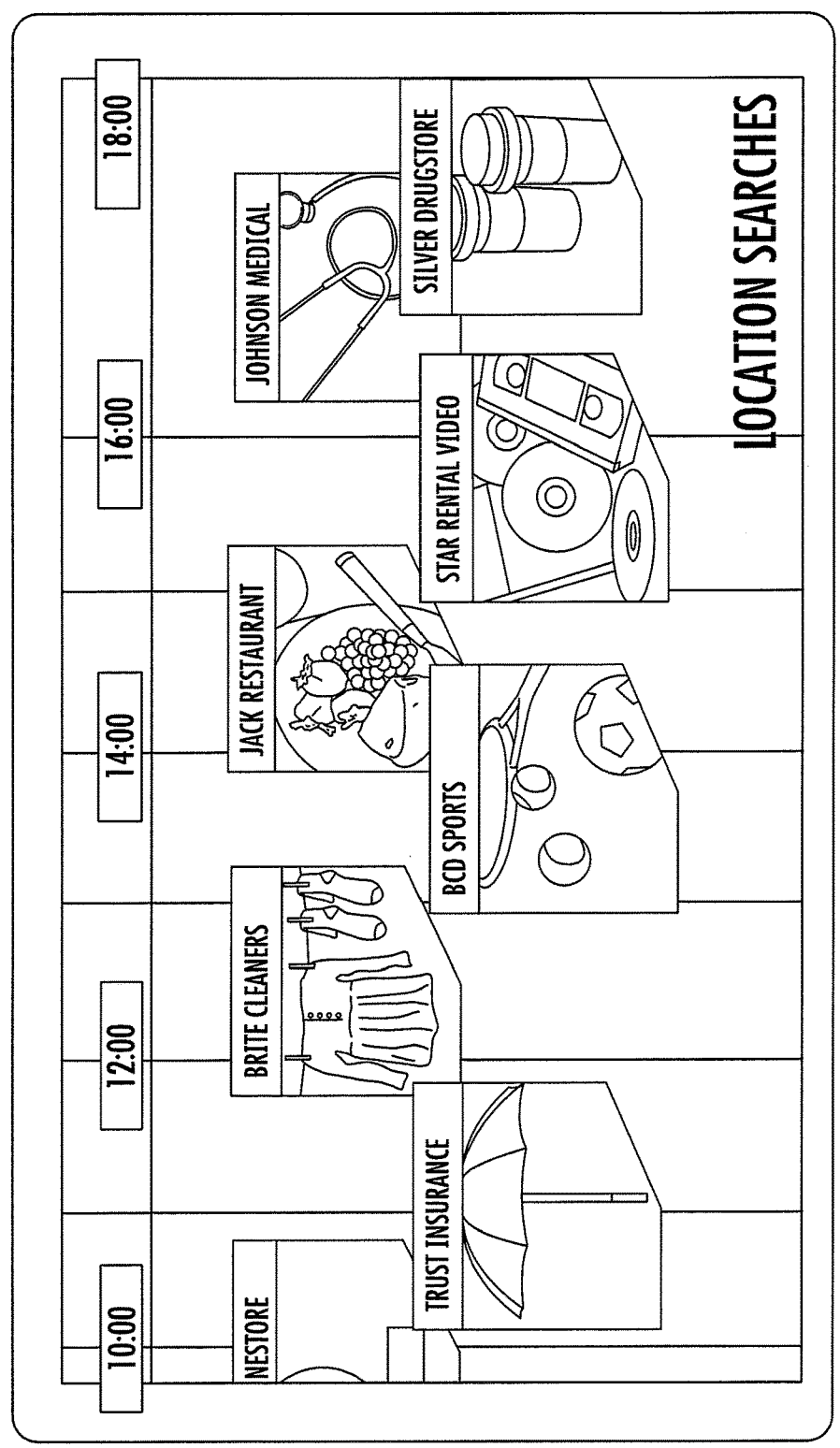
FIG. 7 illustrates examples of location-based snippets within a timeline user interface according to an example embodiment of the present invention.
Figure 8:
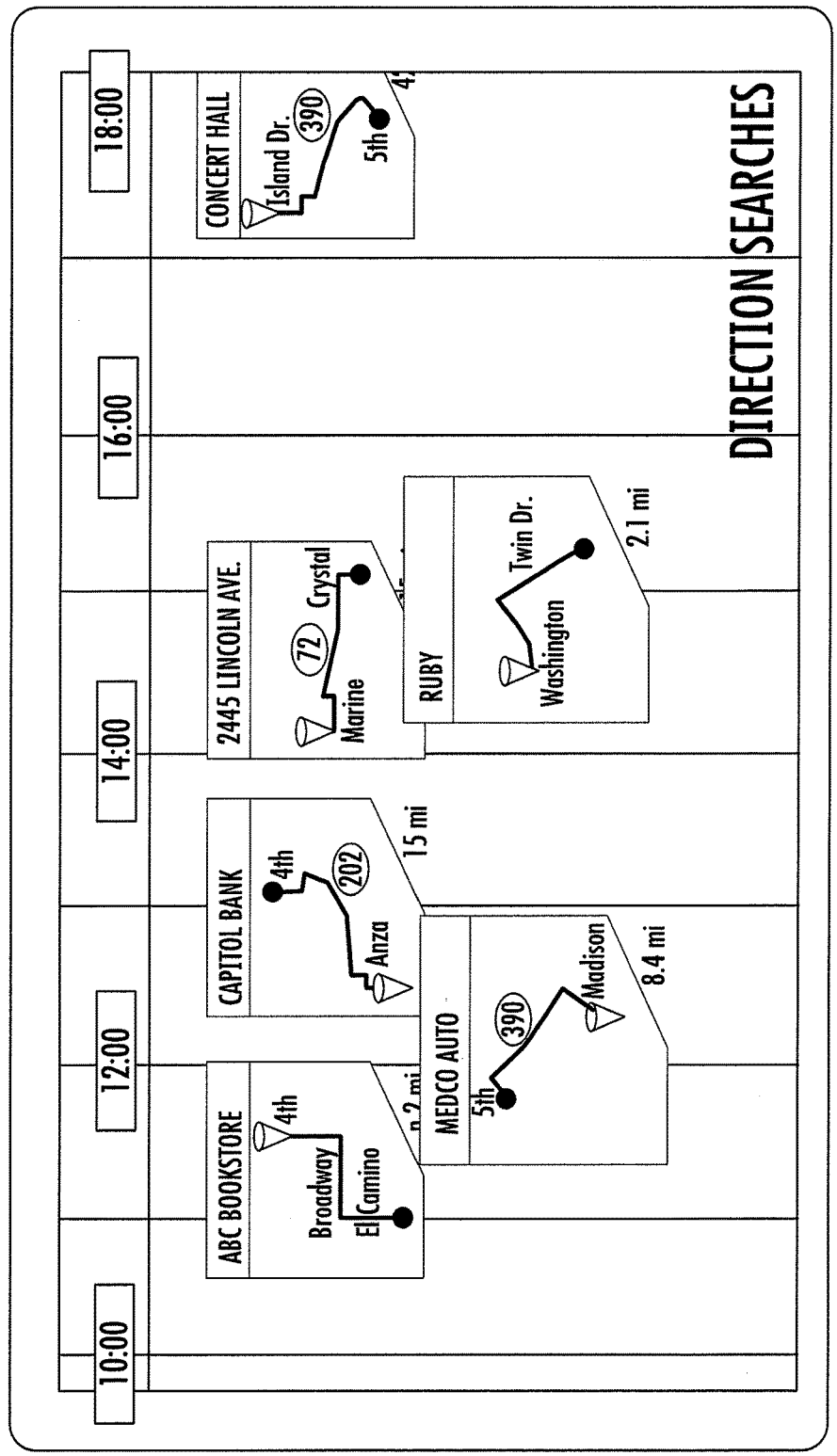
FIG. 8 illustrates examples of direction-based snippets within a timeline user interface according to an example embodiment of the present invention.
Figure 9:
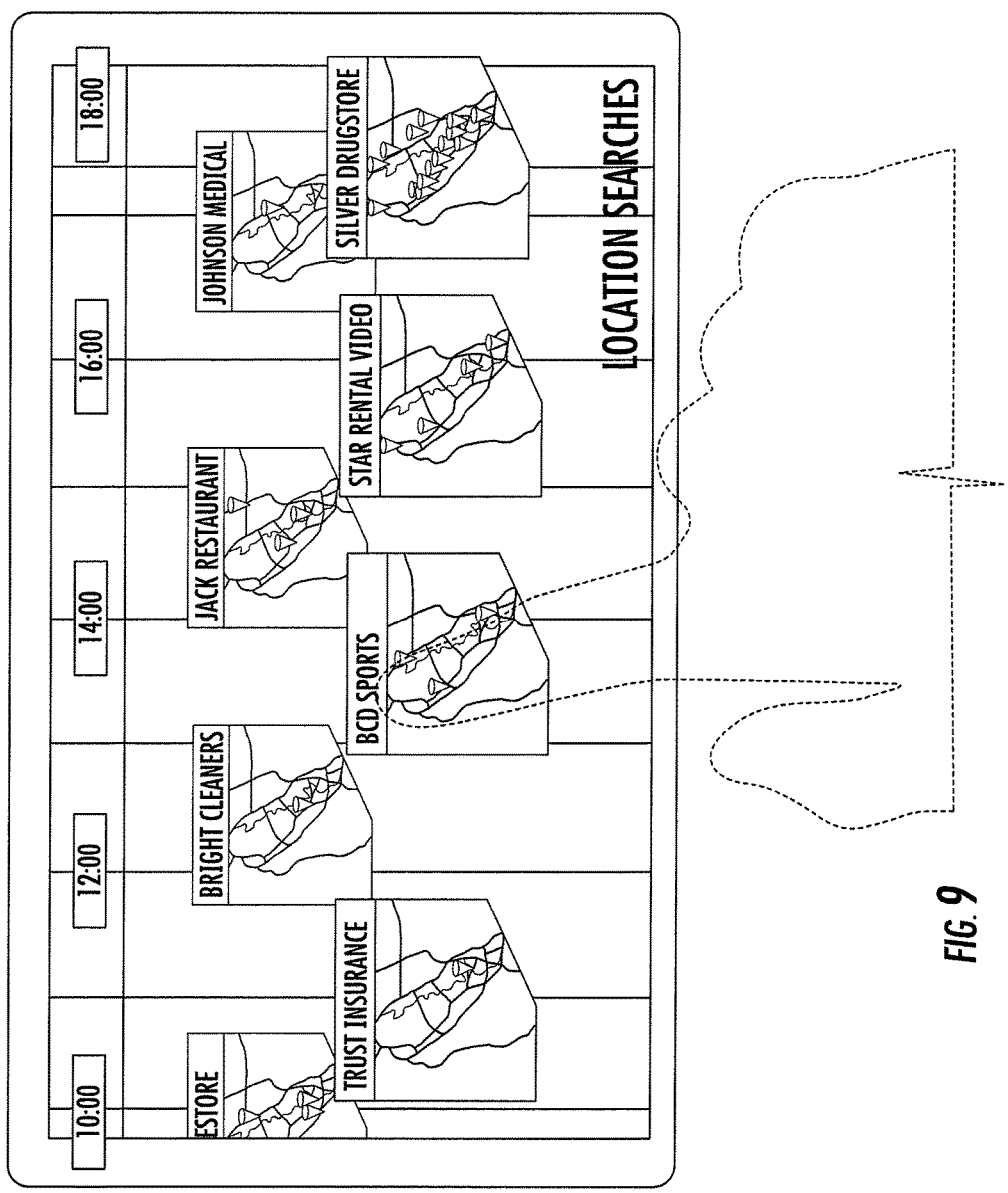
FIG. 9 illustrates additional examples of location-based snippets within a timeline user interface according to an example embodiment of the present invention.

As mentioned above, the map-based snippets, which include location-based and direction-based snippets, may be rendered and displayed on a user interface 108, such as a user interface screen associated with a history log. According to various example embodiments, the map-based snippets may be arranged in chronological order with respect to a time-line based on when the destination was searched or the last time the content page was retrieved. Subsequent to being presented, the snippets may be selected by the user to retrieve the content page and map associated with the snippet. FIGS. 7, 8, and 9 illustrate examples of temporal user interface screens that the may be implemented to display map-based snippets. While the user interface screens in FIGS. 7, 8 and 9 are provided in a landscape orientation, some example embodiments may be provided in a portrait or other orientation. FIGS. 7 and 9 illustrate collections of location-based snippets relative to a timeline, while FIG. 8 illustrates direction-based snippets relative to respective timelines.

Figure 10:
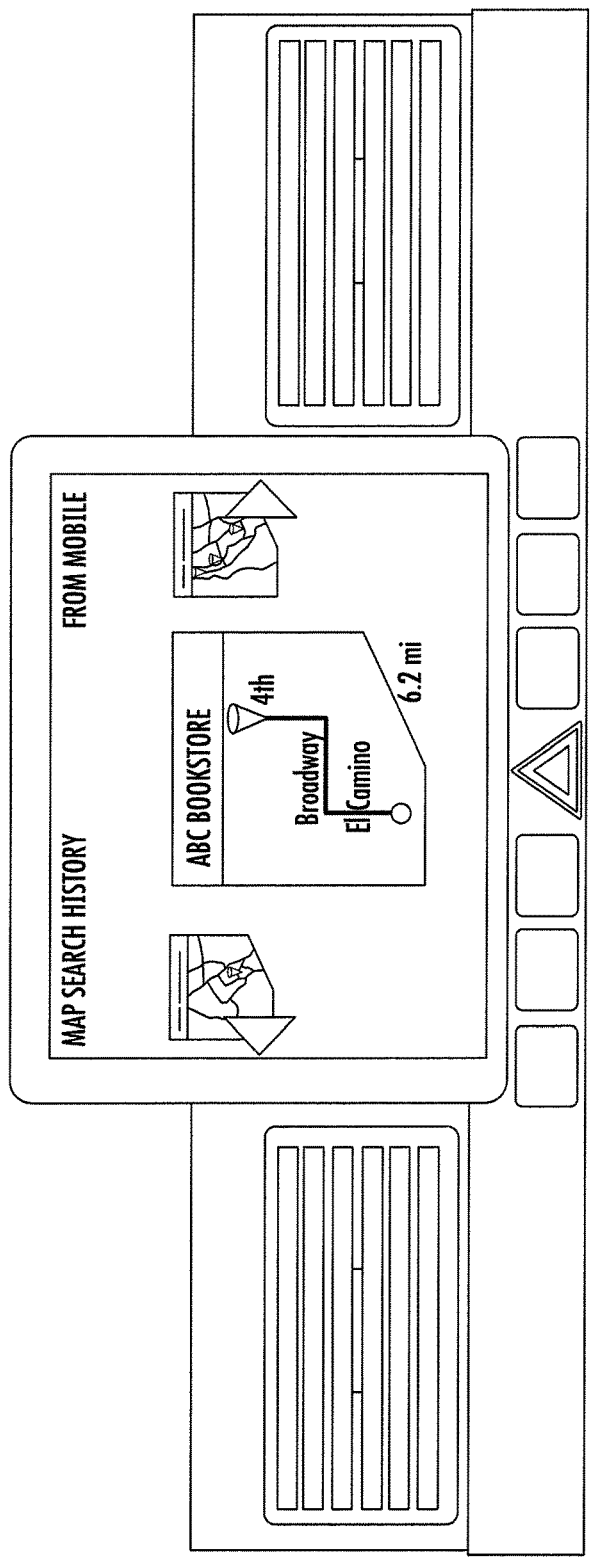
FIG. 10 illustrates an example user interface of a in-vehicle device according to some example embodiments.

FIG. 10 illustrates another example user interface screen that may be implemented on, for example, a device installed in a car dashboard. The user interface screen may or may not organize the snippets with respect to time. The user interface screen as depicted in FIG. 10 includes on screen controls (e.g., arrows) that allow a user to navigate through the snippets to locate a desired snippet.

Additionally, in accordance with various example embodiments of the present invention, snippets or the information used construct the snippets may be shared between devices. In this regard, a content page including a map may be originally retrieved by a first device (e.g., a desktop computer) and a history log of second device (e.g., a navigation device installed in a car) may be updated with the snippet or the information to generate the snippet. According to some example embodiments, the history logs of the first and second devices may be synchronized via, for example, an Internet connection to facilitate the ability to share snippets.

Figure 11:
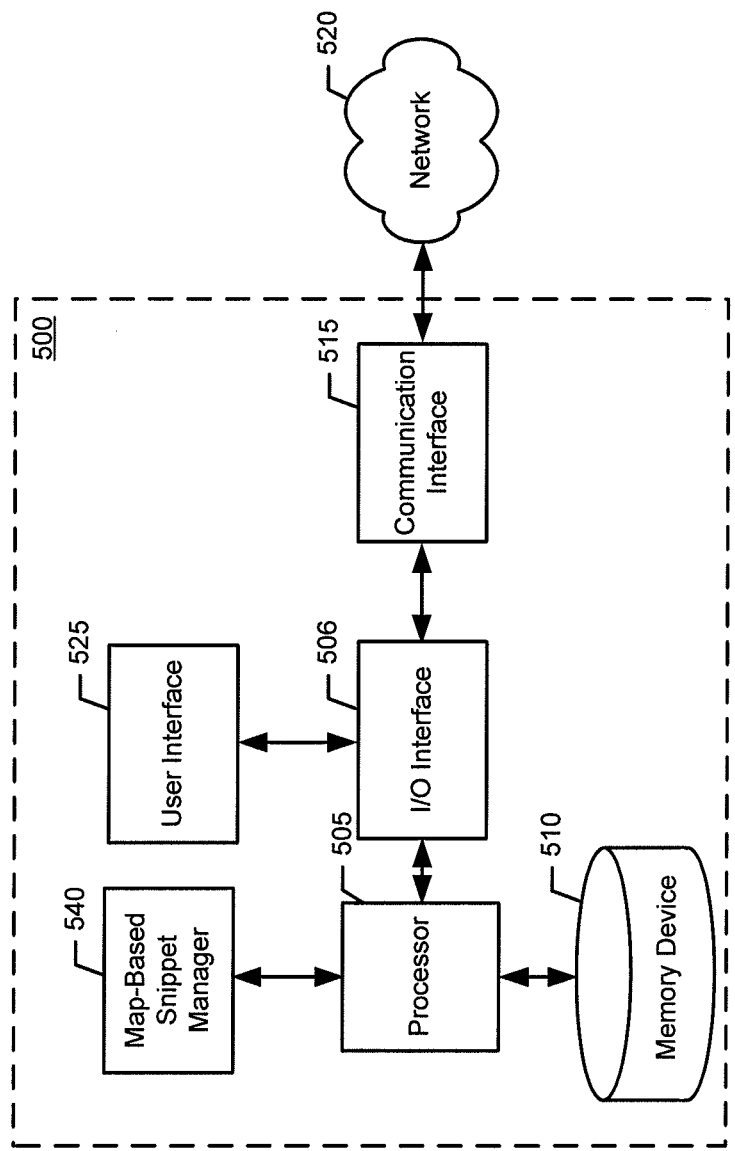
FIG. 11 illustrates a block diagram of an apparatus and associated system for generating map-based snippets according to an example embodiment of the present invention.
Figure 12:
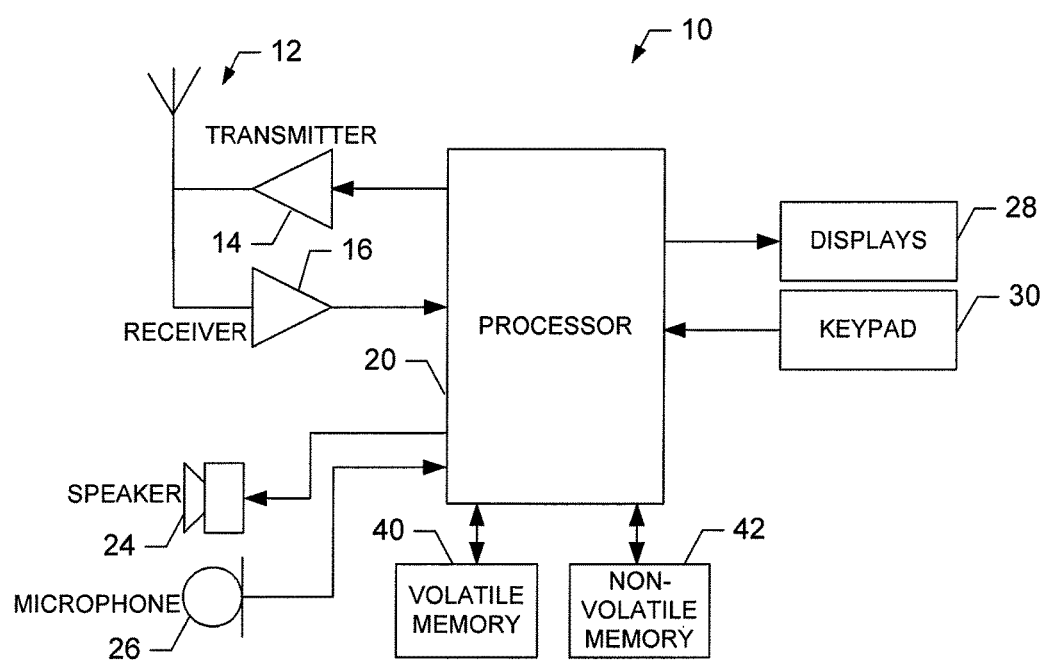
FIG. 12 illustrates a block diagram of a mobile terminal configured for generating map-based snippets according to an example embodiment of the present invention.

The description provided above and generally herein illustrates example methods and techniques, such as the example apparatus 100 of FIG. 1, that may be implemented in the form of example apparatuses, and example computer program products for generating map-based snippets. FIGS. 11 and 12 depict example apparatuses that are configured to perform various functionalities as described herein, including those described with respect to operations of the flowchart of FIG. 13, and the operation otherwise described herein.

Referring now to FIG. 11, an example embodiment of the present invention is depicted as apparatus 500. Apparatus 500 may, be embodied as, or included as a component of, a communications device with wired and/or wireless communications capabilities. In some example embodiments, the apparatus 500 may be part of a communications device, such as a stationary or a mobile communications terminal. As a mobile device, the apparatus 500 may be a mobile and/or wireless communications node such as, for example, a mobile and/or wireless server, computer, access point, communications switching device, handheld wireless device (e.g., telephone, portable digital assistant (PDA), mobile television, gaming device, camera, video recorder, audio/video player, radio, digital book reader, and/or a global positioning system (GPS) device), an in-vehicle navigation device, any combination of the aforementioned, or the like. As a stationary terminal, the apparatus 500 may be a desktop computer, a server, a stationary communications node, or the like. Regardless of the type of communications device, apparatus 500 may also include computing capabilities.

The example apparatus 500 includes or is otherwise in communication with a processor 505, a memory device 510, an Input/Output (I/O) interface 506, a communications interface 515, and a map-based snippet manager 540. The processor 505 may be embodied as various means for implementing the various functionalities of example embodiments of the present invention including, for example, a microprocessor, a coprocessor, a controller, a special-purpose integrated circuit such as, for example, an ASIC (application specific integrated circuit), an FPGA (field programmable gate array), or a hardware accelerator, processing circuitry or the like. According to one example embodiment, processor 505 may be representative of a plurality of processors, or one or more multiple core processors, operating in concert. Further, the processor 505 may be comprised of a plurality of transistors, logic gates, a clock (e.g., oscillator), other circuitry, and the like to facilitate performance of the functionality described herein. The processor 505 may, but need not, include one or more accompanying digital signal processors. In some example embodiments, the processor 505 is configured to execute instructions stored in the memory device 510 or instructions otherwise accessible to the processor 505. The processor 505 may be configured to operate such that the processor causes the apparatus 500 to perform various functionalities described herein.

Whether configured as hardware or via instructions stored on a computer-readable storage medium, or by a combination thereof, the processor 505 may be an entity capable of performing operations according to embodiments of the present invention while configured accordingly. Thus, in example embodiments where the processor 505 is embodied as, or is part of, an ASIC, FPGA, or the like, the processor 505 is specifically configured hardware for conducting the operations described herein. Alternatively, in example embodiments where the processor 505 is embodied as an executor of instructions stored on a computer-readable storage medium, the instructions specifically configure the processor 505 to perform the algorithms and operations described herein. In some example embodiments, the processor 505 is a processor of a specific device (e.g., a communications server or mobile terminal) configured for employing example embodiments of the present invention by further configuration of the processor 505 via executed instructions for performing the algorithms, methods, and operations described herein.

The memory device 510 may be one or more tangible and/or non-transitory computer-readable storage media that may include volatile and/or non-volatile memory. In some example embodiments, the memory device 510 includes Random Access Memory (RAM) including dynamic and/or static RAM, on-chip or off-chip cache memory, and/or the like. Further, memory device 510 may include non-volatile memory, which may be embedded and/or removable, and may include, for example, read-only memory, flash memory, magnetic storage devices (e.g., hard disks, floppy disk drives, magnetic tape, etc.), optical disc drives and/or media, non-volatile random access memory (NVRAM), and/or the like. Memory device 510 may include a cache area for temporary storage of data. In this regard, some or all of memory device 510 may be included within the processor 505. In some example embodiments, the memory device 510 may store a map server, as described above, that can be queried and provide components for constructing a map-based snippet.

Further, the memory device 510 may be configured to store information, data, applications, computer-readable program code instructions, and/or the like for enabling the processor 505 and the example apparatus 500 to carry out various functions in accordance with example embodiments of the present invention described herein. For example, the memory device 510 could be configured to buffer input data for processing by the processor 505. Additionally, or alternatively, the memory device 510 may be configured to store instructions for execution by the processor 505.

The I/O interface 506 may be any device, circuitry, or means embodied in hardware, software, or a combination of hardware and software that is configured to interface the processor 505 with other circuitry or devices, such as the communications interface 515. In some example embodiments, the processor 505 may interface with the memory 510 via the I/O interface 506. The I/O interface 506 may be configured to convert signals and data into a form that may be interpreted by the processor 505. The I/O interface 506 may also perform buffering of inputs and outputs to support the operation of the processor 505. According to some example embodiments, the processor 505 and the I/O interface 506 may be combined onto a single chip or integrated circuit configured to perform, or cause the apparatus 500 to perform, various functionalities of the present invention.

The communication interface 515 may be any device or means embodied in hardware, a computer program product, or a combination of hardware and a computer program product that is configured to receive and/or transmit data from/to a network 520 and/or any other device or module in communication with the example apparatus 500. The communications interface may be configured to communicate information via any type of wired or wireless connection, and via any type of communications protocol, such as a communications protocol that supports cellular communications. According to various example embodiments, the communication interface 515 is configured to support the transmission and reception of communications in cellular networks. In this regard, the communications interface 515 may be configured to support device-to-device communications. Processor 505 may also be configured to facilitate communications via the communications interface 515 by, for example, controlling hardware included within the communications interface 515. In this regard, the communication interface 515 may include, for example, communications driver circuitry (e.g., circuitry that supports wired communications via, for example, fiber optic connections), one or more antennas, a transmitter, a receiver, a transceiver and/or supporting hardware, including, for example, a processor for enabling communications. Via the communication interface 515, the example apparatus 500 may communicate with various other network entities in a device-to-device fashion and/or via indirect communications via a base station, access point, server, gateway, router, or the like.

The user interface 525 may be in communication with the processor 505 to receive user input via the user interface 525 and/or to present output to a user as, for example, audible, visual, mechanical or other output indications. The user interface 525 may include, for example, a keyboard, a mouse, a joystick, a display (e.g., a touch screen display), a microphone, a speaker, or other input/output mechanisms. Further, the processor 505 may comprise, or be in communication with, user interface circuitry configured to control at least some functions of one or more elements of the user interface. The processor 505 and/or user interface circuitry may be configured to control one or more functions of one or more elements of the user interface through computer program instructions (e.g., software and/or firmware) stored on a memory accessible to the processor 505 (e.g., volatile memory, non-volatile memory, and/or the like). The user interface 525 may also be configured to support the implementation of haptic feedback. In this regard, the user interface 525, as controlled by processor 505, may include a vibra, a piezo, and/or an audio device configured for haptic feedback as described herein. In some example embodiments, the user interface circuitry is configured to facilitate user control of at least some functions of the apparatus 500 through the use of a display and configured to respond to user inputs. The processor 505 may also comprise, or be in communication with, display circuitry configured to display at least a portion of a user interface, the display and the display circuitry configured to facilitate user control of at least some functions of the apparatus 500.

The user interface 525 may also include one or more displays, such as touch screen displays. Each touch screen display may be configured to visually present graphical information to a user. The touch screen displays, which may be embodied as any known touch screen display, may also include a touch detection surface configured to enable touch recognition by any suitable technique, such as resistive, capacitive, infrared, strain gauge, surface wave, optical imaging, dispersive signal technology, acoustic pulse recognition, or other like techniques. The touch screen displays may include all of the hardware necessary to detect a touch when contact is made with the touch detection surface. A touch event may occur when an object, such as a stylus, finger, pen, pencil or any other pointing device, comes into contact with a portion of the touch detection surface of the touch screen display in a manner sufficient to register as a touch. The touch screen displays may also be configured to generate touch event location data indicating the location of the touch event on the screen.

The map-based snippet manager 540 of example apparatus 500 may be any means or device embodied, partially or wholly, in hardware, a computer program product, or a combination of hardware and a computer program product, such as processor 505 implementing stored instructions to configure the example apparatus 500, memory device 510 storing executable program code instructions configured to carry out the functions described herein, or a hardware configured processor 505 that is configured to carry out the functions of the map-based snippet manager 540 as described herein. In an example embodiment, the processor 505 includes, or controls, the map-based snippet manager 540. The map-based snippet manager 540 may be, partially or wholly, embodied as processors similar to, but separate from processor 505. In this regard, the map-based snippet manager 540 may be in communication with the processor 505. In various example embodiments, the map-based snippet manager 540 may, partially or wholly, reside on differing apparatuses such that some or all of the functionality of the map-based snippet manager 540 may be performed by a first apparatus, and the remainder of the functionality of the map-based snippet manager 540 may be performed by one or more other apparatuses.

Further, the apparatus 500 and the processor 505 may be configured to perform the following functionality via map-based snippet manager 540. In this regard, the snippet manager 540 may be configured to cause or direct the processor 505 and/or the apparatus 500 to perform various functionalities, such as those described with respect to FIGS. 1-10 and FIG. 13 and as generally described herein.

Figure 13:
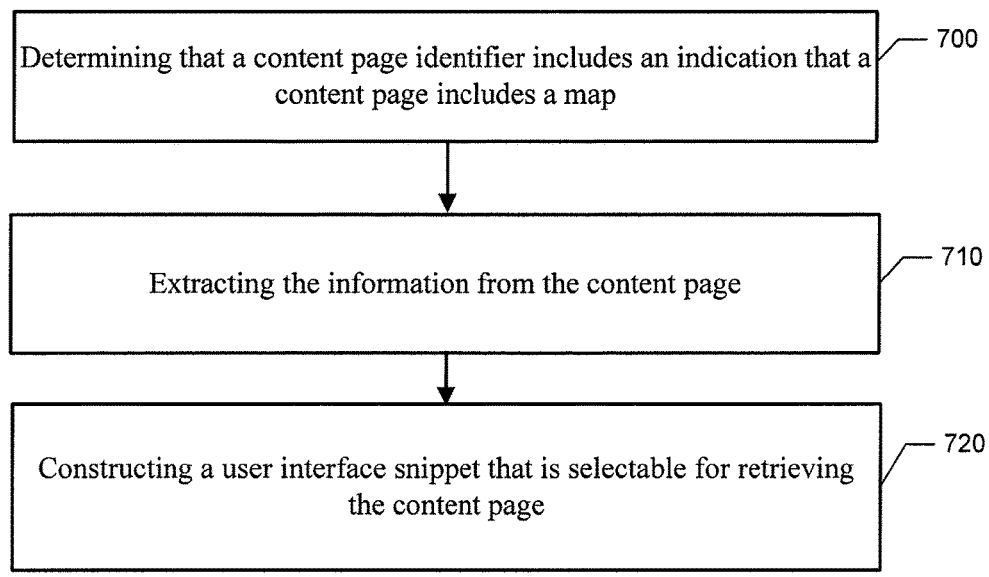
FIG. 13 is a flowchart of an example method for generating map-based snippets according to an example embodiment of the present invention.

For example, with reference to FIG. 13, the snippet manager 540 may be configured to determine that a content page identifier includes an indication that a content page includes a map at 700. The data for rendering the content page may include at least destination information, and the snippet manager 540 may be configured to extract the destination information from the content page in response to determining that the content page identifier includes an indication that the content page includes a map at 710. Further, the snippet manager 540 may also be configured to construct a user interface snippet that is selectable for retrieving the content page, where the user interface snippet includes a component that is generated based at least in part on the destination information at 720.

In some example embodiments, the snippet manager 540 may be configured to receive the component from a map server in response to a query of the map server. In this regard, the query may be based at least on the destination information. Additionally, or alternately, according to some example embodiments, the snippet manager 540 may be configured to analyze the destination information to determine a destination and/or a category of the destination. In some example embodiments, the component of the user interface snippet may be an image of an object that bears a relationship to the category of the destination. Additionally, or alternately, according to some example embodiments, the snippet manager 540 may be configured to extract starting point information from the content page, and generate data for rendering a filtered and scaled depiction of a route between the starting point and the destination. In this regard, in some example embodiments, the component of the user interface snippet may be data for rendering the filtered and scaled depiction of the route. Further, according to some example embodiments, the snippet manager 540 may be additionally, or alternatively, configured to cause the content page identifier to be retrieved from history log. The history log may include a plurality of content page identifiers for content pages that have previously been retrieved. Additionally, or alternatively, the snippet manager 540 may be configured to cause the user interface snippet to be displayed in a chronological order based at least on a time when the content page was last retrieved.

Referring now to FIG. 12, a more specific example apparatus in accordance with various embodiments of the present invention is provided. The example apparatus of FIG. 12 is a mobile terminal 10 configured to communicate within a wireless network, such as a cellular communications network. The mobile terminal 10 may be configured to perform the functionality of apparatus 500 as described herein. More specifically, the mobile terminal 10 may be caused to perform the functionality described with respect to FIGS. 1-11 and FIG. 13 via the processor 20. Processor 20 may be an integrated circuit or chip configured similar to the processor 505 together with, for example, the I/O interface 506. Further, volatile memory 40 and non-volatile memory 42 may be configured to support the operation of the processor 20 as computer readable storage media.

The mobile terminal 10 may also include an antenna 12, a transmitter 14, and a receiver 16, which may be included as parts of a communications interface of the mobile terminal 10. The speaker 24, the microphone 26, displays 28 (which may be touch screen displays), and the keypad 30 may be included as parts of a user interface.

FIG. 13 illustrates flowcharts of example systems, methods, and/or computer program products according to example embodiments of the invention. It will be understood that each operation of the flowcharts, and/or combinations of operations in the flowcharts, can be implemented by various means. Means for implementing the operations of the flowcharts, combinations of the operations in the flowchart, or other functionality of example embodiments of the present invention described herein may include hardware, and/or a computer program product including a computer-readable storage medium (as opposed to a computer-readable transmission medium which describes a propagating signal) having one or more computer program code instructions, program instructions, or executable computer-readable program code instructions stored therein. In this regard, program code instructions for performing the operations and functions of FIG. 13 and otherwise described herein may be stored on a memory device, such as memory device 510, volatile memory 40, or volatile memory 42, of an example apparatus, such as example apparatus 500 or mobile terminal 10, and executed by a processor, such as the processor 505 or processor 20. As will be appreciated, any such program code instructions may be loaded onto a computer or other programmable apparatus (e.g., processor 505, memory device 510, or the like) from a computer-readable storage medium to produce a particular machine, such that the particular machine becomes a means for implementing the functions specified in the flowcharts' operations. These program code instructions may also be stored in a computer-readable storage medium that can direct a computer, a processor, or other programmable apparatus to function in a particular manner to thereby generate a particular machine or particular article of manufacture. The instructions stored in the computer-readable storage medium may produce an article of manufacture, where the article of manufacture becomes a means for implementing the functions specified in the flowcharts' operations. The program code instructions may be retrieved from a computer-readable storage medium and loaded into a computer, processor, or other programmable apparatus to configure the computer, processor, or other programmable apparatus to execute operations to be performed on or by the computer, processor, or other programmable apparatus. Retrieval, loading, and execution of the program code instructions may be performed sequentially such that one instruction is retrieved, loaded, and executed at a time. In some example embodiments, retrieval, loading and/or execution may be performed in parallel such that multiple instructions are retrieved, loaded, and/or executed together. Execution of the program code instructions may produce a computer-implemented process such that the instructions executed by the computer, processor, or other programmable apparatus provide operations for implementing the functions specified in the flowcharts' operations.

Accordingly, execution of instructions associated with the operations of the flowchart by a processor, or storage of instructions associated with the blocks or operations of the flowcharts in a computer-readable storage medium, support combinations of operations for performing the specified functions. It will also be understood that one or more operations of the flowcharts, and combinations of blocks or operations in the flowcharts, may be implemented by special purpose hardware-based computer systems and/or processors which perform the specified functions, or combinations of special purpose hardware and program code instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
retrieving, from a history log, an indication of a content page identifier comprising a resource address previously accessed via a browser and provided by a third party website;
determining that the content page identifier comprises an indication that a content page identified by the resource address and provided by the third party website comprises a map, wherein data for rendering the content page by the browser includes at least destination information;
in response to determining that the content page identifier accessed in the history log comprises an indication that the content page includes a map, extracting the destination information from the data for rendering the content page;
causing provision of the destination information to a computing device remote from the third party website having provided the data for rendering the content page;
constructing a user interface snippet that comprises a link for retrieving the content page comprising the map via the third party website, the user interface snippet including a component comprising at least a simplified route image, wherein the simplified route image is generated by the computing device that is remote from the third party website having provided the data for rendering the content page, and is based at least in part on the destination information, wherein the simplified route image is simplified relative to the map of the content page;
analyzing the destination information to determine the destination and the category of the destination; and wherein constructing the user interface snippet includes constructing the user interface snippet comprising the component, the component further comprising an image of an object that represents the category of the destination; and
the simplified route image, comprises extracting starting point information from the content page; and
generating data for rendering a filtered and scaled depiction of a route between the starting point and the destination, wherein the simplified route image comprises the data for rendering the filtered and scaled depiction of the route between the starting point and the destination.

2. The method of claim 1, further comprising receiving the component from a map server in response to a query of the map server, wherein the query is based at least on the destination information.

3. The method of claim 1, further comprising causing the content page identifier to be retrieved from history log, the history log including a plurality of content page identifiers for content pages that have previously been retrieved, and the snippet being representative of an accessed content page.

4. The method of claim 1, further comprising causing the user interface snippet to be displayed in a chronological order based at least on a time when the content page was last retrieved.

5. An apparatus comprising at least one processor and at least one memory including computer program code, the at least one memory and the computer program code configured to, with the at least one processor, direct the apparatus at least to:
retrieve, from a history log, an indication of a content page identifier comprising a resource address previously accessed via a browser and provided by a third party website;
determine that the content page identifier comprises an indication that a content page identified by the resource address and provided by the third party website comprises a map, wherein data for rendering the content page by the browser includes at least destination information;
in response to determining that the content page identifier accessed in the history log comprises an indication that the content page includes a map, extract the destination information from the content page;
cause provision of the destination information to a computing device remote from the third party website having provided the data for rendering the content page;
construct a user interface snippet that comprises a link for retrieving the content page comprising the map via the third party website, the user interface snippet including a component comprising at least a simplified route image, wherein the simplified route image is generated by the computing device that is remote from the third party website having provided the data for rendering the content page, and is based at least in part on the destination information, wherein the simplified route image is simplified relative to the map of the content page;
analyze the destination information to determine the destination and the category of the destination; and wherein the apparatus caused to construct the user interface snippet includes being caused to construct the user interface snippet comprising the component, the component further comprising an image of an object that represents the category of the destination; and
the simplified route image directed to: extract starting point information from the content page; and
generate data for rendering a filtered and scaled depiction of a route between the starting point and the destination, wherein the simplified route image comprises the data for rendering the filtered and scaled depiction of the route between the starting point and the destination.

6. The apparatus of claim 5, wherein the apparatus is further directed to receive the component from a map server in response to a query of the map server, wherein the query is based at least on the destination information.

7. The apparatus of claim 5, wherein the apparatus is further directed to cause the content page identifier to be retrieved from history log, the history log including a plurality of content page identifiers for content pages that have previously been retrieved, and the snippet being representative of an accessed content page.

8. The apparatus of claim 5, wherein the apparatus is further directed to cause the user interface snippet to be displayed in a chronological order based at least on a time when the content page was last retrieved.

9. The apparatus of claim 5, wherein the apparatus comprises a mobile terminal.

10. The apparatus of claim 9, wherein the apparatus further comprises user interface circuitry and components including a display configured to display the user interface snippet.

11. A computer program product comprising a memory having program code stored thereon, the program code configured to direct an apparatus to:

retrieve, from a history log, an indication of a content page identifier comprising a resource address previously accessed via a browser and provided by a third party website:

determine that the content page identifier comprises an indication that a content page identified by the resource address comprises a map, wherein data for rendering the content page includes at least destination information;

in response to determining that the content page identifier comprises an indication that the content page includes a map, extract the destination information from the content page;

cause provision of the destination information to a computing device remote from the third party website;

construct a user interface snippet that comprises a link for retrieving the content page comprising the map via the third party website, the user interface snippet including a component comprising at least a simplified route image, wherein the simplified route image is generated by a source other than the content page and is based at least in part on the destination information, wherein the simplified route image is simplified relative to the map of the content page;

analyze the destination information to determine the destination and the category of the destination; and wherein the program code configured to direct the apparatus to construct the user interface snippet includes comprises being configured to direct the apparatus to construct the user interface snippet comprising the component, the component further comprising an image of an object that represents the category of the destination; and the simplified route image, directed to: extract starting point information from the content page; and generate data for rendering a filtered and scaled depiction of a route between the starting point and the destination, wherein the simplified route image comprises the data for rendering the filtered and scaled depiction of the route between the starting point and the destination.

12. The computer program product of claim 11, wherein the program code is further configured to direct the apparatus to receive the component from a map server in response to a query of the map server, wherein the query is based at least on the destination information.

13. The computer program product of claim 11, wherein the program code is further configured to direct the apparatus to cause the content page identifier to be retrieved from history log, the history log including a plurality of content page identifiers for content pages that have previously been retrieved, and the snippet being representative of an accessed content page.

14. The computer program product of claim 11, wherein the program code is further configured to direct the apparatus to cause the user interface snippet to be displayed in a chronological order based at least on a time when the content page was last retrieved.

* * * * *

UNITED STATES PATENT AND TRADEMARK OFFICE
CERTIFICATE OF CORRECTION

PATENT NO. : 10,066,948 B2  
APPLICATION NO. : 12/794341  
DATED : September 4, 2018  
INVENTOR(S) : Setlur et al.

Page 1 of 1

It is certified that error appears in the above-identified patent and that said Letters Patent is hereby corrected as shown below:

In the Claims

Column 18,  
Line 1, "includes comprises being configured" should read --comprises being configured--.

Signed and Sealed this  
Nineteenth Day of February, 2019

Andrei Iancu  
*Director of the United States Patent and Trademark Office*